UNITED STATES PATENT OFFICE.

HERMANN MECHLENBURG, OF KÖPENICK, NEAR BERLIN, GERMANY, ASSIGNOR TO NITRITFABRIK AKTIENGESELLSCHAFT, OF KÖPENICK, NEAR BERLIN, GERMANY.

PROCESS OF PREPARING TANNIFEROUS MATERIAL FOR EXTRACTION.

979,080. Specification of Letters Patent. Patented Dec. 20, 1910.

No Drawing. Application filed July 19, 1910. Serial No. 572,739.

*To all whom it may concern:*

Be it known that I, HERMANN MECHLENBURG, a citizen of the German Empire, residing at Köpenick, near Berlin, Germany, have invented new and useful Improvements in Processes of Preparing Tanniferous Material for Extraction, of which the following is a specification.

In processes for the preparation of tannic extracts and tannic acid from tannic bearing matters care must be taken to prevent the partial decomposition of the tannic acid which readily takes place on lixiviating the tannic matter. Such decomposition due to the presence of fungus and enzyms may be prevented by a preliminary heating of the tannic bearing material in a dry state before it is subjected to lixiviation. Experiments have shown that the same effect can be attained in the cold and even with a better result if the tannic bearing material be exposed for some time to an atmosphere of sulfurous acid gas whereupon the mass is lixiviated. The tannic bearing materials most suitable for the present process are myrobalans, gall-nuts, sumac, divi-divi, algarrobilla and the like. The quantity of the sulfurous acid gas used and the time or duration of the action of the gas on the raw-material varies according to the nature of the latter. As a rule, 0.5% of sulfurous acid calculated on the weight of the tannic material and a treatment of about 1 hour will be quite sufficient for the purpose. However, I do not limit myself to the quantity and time of action stated as I may use more or less sulfurous acid gas and for a longer or shorter period if the nature of the raw-material makes it advisable to do so.

The operation referred to may be advantageously carried out in the diffusing apparatus; the gaseous sulfurous acid may afterward be expelled by sterilized air in order to avoid the formation of sulfuric acid in the solutions. The liquors thus obtained can be kept for any reasonable length of time even in a dilute state without decomposition.

I am well aware of sulfurous acid having been used before for decoloring tannic solutions, in which case the sulfurous acid is added to the liquors obtained by lixiviation or even at a later stage. That process is altogether different from mine, where the raw material before the lixiviation is treated directly with sulfurous acid in a dry state in order to destroy any fungus and enzyms that may give rise to fermentation and decomposition of the tannic solutions during the subsequent lixiviation. It will therefore be understood that in my process the treatment with sulfurous acid takes place before the tannic bearing material is lixiviated in order to prevent a decomposition during the subsequent lixiviation stage, or at a later stage. It has also been proposed to employ sulfites or bisulfites for rendering soluble the tanning principles of tan-woods in order to prepare tanning extracts therefrom readily soluble in cold water. My process as described and set out is clearly differentiated herefrom, it being altogether out of the question to use tan-woods in my process and vice versa.

Having now described my invention, I claim as new and desire to secure by Letters Patent:—

1. A process for the preparation of tannic material for extraction, consisting in subjecting the tannic material for some time to the action of gaseous sulfur dioxid before lixiviation.

2. A process for the preparation of tannic material for extraction with water consisting in subjecting the tannic material for some time to the action of gaseous sulfur dioxid and displacing the latter by sterilized air before lixiviation.

In testimony whereof I have signed my name to this specification in the presence of two subscribing witnesses.

HERMANN MECHLENBURG.

Witnesses:
WOLDEMAR HAUPT,
HENRY HASPER.